US006344895B1

(12) United States Patent
Yasuda et al.

(10) Patent No.: US 6,344,895 B1
(45) Date of Patent: Feb. 5, 2002

(54) PAPER MONEY IDENTIFICATION DEVICE

(75) Inventors: Shigeru Yasuda, Tsurugashima; Yuichi Sakamoto, Higashimatsuyama; Tadashi Hatamachi, Sakado; Tetsuro Kikuchi, Tsurugashima, all of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/603,947

(22) Filed: Jun. 27, 2000

(30) Foreign Application Priority Data

Jul. 1, 1999 (JP) .......................................... 11-187636

(51) Int. Cl.[7] ............................ G06K 9/74; G01C 9/12
(52) U.S. Cl. .................................... 356/71; 250/559.01
(58) Field of Search ....................... 356/71, 432, 237.1, 356/237.2; 250/555–557, 559.39, 559.4, 559.44; 524/910, 911, 912; 525/403, 404, 407; 382/112, 113, 135, 137

(56) References Cited

U.S. PATENT DOCUMENTS

| | | | | | |
|---|---|---|---|---|---|
| 3,922,557 | A | * | 11/1975 | Carnes, Jr. | 250/578 |
| 4,719,263 | A | * | 1/1988 | Barnhouse et al. | 525/187 |
| 5,256,484 | A | * | 10/1993 | Sato et al. | 428/426 |
| 5,903,339 | A | * | 5/1999 | Levasseur | 356/71 |
| 6,090,907 | A | * | 7/2000 | Saito et al. | 528/198 |

* cited by examiner

*Primary Examiner*—Frank G. Font
*Assistant Examiner*—Michael P. Stafira
(74) *Attorney, Agent, or Firm*—Welsh & Katz, Ltd.

(57) ABSTRACT

A surface of an optical sensor which faces on a paper money transport path is covered by transparent antistatic covers in order to prevent to as great an extent as possible the adhering of dust and dirt to the optical sensor.

6 Claims, 3 Drawing Sheets

PAPER MONEY IDENTIFICATION DEVICE

BACKGROUND OF THE INVENTION

1. Field of the Invention

The present invention relates to the improvement of paper money identification devices which determine the authenticity of inserted paper money.

2. Description of the Related Art

Paper money identification devices which identify the genuineness of inserted paper money are generally finished in paper money processing devices for determining the genuineness of inserted paper money, storing genuine notes in a stacker and rejecting non-genuine notes.

Such paper money identification devices are generally constituted by an optical sensor comprising light-emitting and light-receiving elements (light-emitting and light receiving diodes) which identify the shade variation of the paper money, and a magnetic sensor comprising a magnetic head for detecting the magnetism of the paper money. These sensors are arranged so as to be exposed facing the paper money transport path of the paper money processing device.

In such paper money identification devices which comprise an optical sensor and a magnetic sensor, when an inserted paper money is passed along the paper money transport path, the optical sensor identifies the shade variation of the inserted paper money, and the magnetic sensor detects the magnetism of the paper money.

Threshold values are respectively established beforehand for the detection values of these sensors. When the detection values of an inserted paper money as detected by the optical sensor and magnetic sensor fall outside the threshold values, the paper money will be judged “not genuine” and will be returned via the paper money insertion port. On the other hand, when the respective detection values of the inserted paper money as detected by the optical sensor and magnetic sensor fall within the threshold values, the paper money will be judged “genuine”, and the paper money then transported further downstream on the paper money transport path and stored in the stacker.

In recent years, in order to reduce weight, lower costs and other reasons, the paper money transport path has been composed of a chute generally formed from a plastic or other synthetic resin.

As described above, the paper money identification devices employ the optical sensor. The optical sensor has a problem that, if any dust or dirt adheres to the optical sensor, its sensitivity will suffer and accurate detection of the paper money shade variation will become impossible.

On the other hand, as mentioned above, the chute, which constitutes the paper money transport path on which the optical sensor is disposed, is usually formed from a plastic or other synthetic resin. These materials can readily generate an electrostatic charge thereon. Further, when a paper money passes along this chute, the friction between the chute and the paper money can readily strengthen the electrostatic charge in this area.

Therefore, when dust or dirt having entered through the paper money insertion port, or paper money to which such dust and dirt have adhered, passes through the chute made of a synthetic resin, the electrostatic charge generated on the chute will cause the dust and dirt to become attached to the chute. Should the dust and dirt become attached to the optical sensor which is exposed on the path, as noted above, its sensitivity will suffer and accurate detection of the paper money shade variation will become impossible.

SUMMARY OF THE INVENTION

With the foregoing issues in view, it is an object of the present invention to provide a paper money identification device which prevents to as great an extent as possible the adhering of dust and dirt to the optical sensor.

In order to achieve the aforementioned object, in a first paper money identification device according to the present invention, which detects shade variation of a paper money that passes along a paper money transport path by means of an optical sensor to judge authenticity of the paper money, a surface of the optical sensor facing on the paper money transport path is covered by a transparent antistatic cover.

Moreover, in a second paper money identification device according to the present invention, which detects shade variation of a paper money which passes along a chute serving as a paper money transport path by means of an optical sensor disposed at the chute to judge authenticity of the paper money, the chute is formed from an antistatic synthetic resin.

Moreover, in a third paper money identification device according to the present invention, which detects shade variation of a paper money which passes along a chute serving as a paper money transport pa th by means of an optical sensor to judge authenticity of the paper money, the chute is subjected to an antistatic coating treatment, and the optical sensor is disposed on the chute that has been subjected to the antistatic coating treatment.

DESCRIPTION OF THE PREFERRED EMBODIMENTS

A first embodiment of the paper money identification device according to the present invention is described below.

Figure 1:
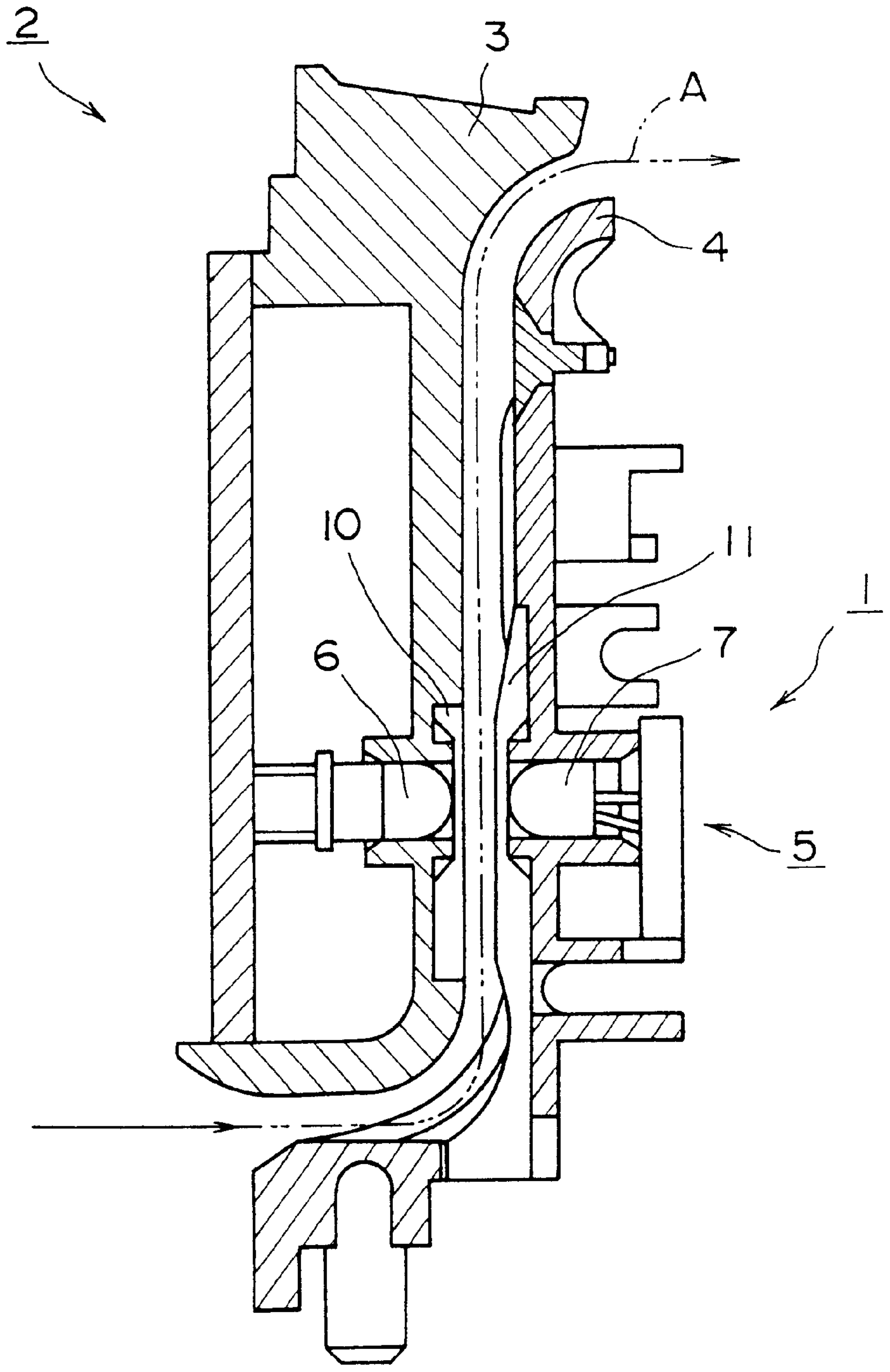
FIG. 1 is a cross-sectional view of the essential portion of the paper money transport path to which the paper money identification device according to the present invention has been mounted.

FIG. 1 is a cross-sectional view of the essential portion of a paper money transport path 2, on which the paper money identification device 1 according to the present invention is disposed.

The paper money transport path 2 is constituted by a first chute 3 and a second chute 4, which are spaced a predetermined distance apart and are disposed in a mutually opposed fashion, with a paper money transport path A being formed therebetween. The first chute 3 and the second chute 4 are formed from a plastic or other synthetic resin which has high electrostatic chargeability.

A light-emitting element 6, which comprises a light-emitting diode, is disposed in -a predetermined location on this first chute 3, and a light-receiving element 7, which comprises a light-receiving diode, is disposed on the second chute 4, at a location opposite the light emitting element 6. The light-emitting element 6 and the light receiving element 7 constitute the optical sensor 5 for the paper money identification device 1.

The location at which the light emitting element 6 and light-receiving element 7 are disposed is not limited to the aforementioned embodiment. It is possible for the light-emitting element 6 to be disposed on the second chute 4 and the light-receiving element 7 to be disposed on the first chute 3.

Transparent antistatic covers 10, 11 are disposed in respective positions on the first and second chutes 3 and 4 where the light emitting element 6 and light-receiving element 7 face on the paper money transport path A. These transparent antistatic covers 10, 11 are detachably mounted on corresponding first and second chutes 3 and 4, respectively.

Figure 2:
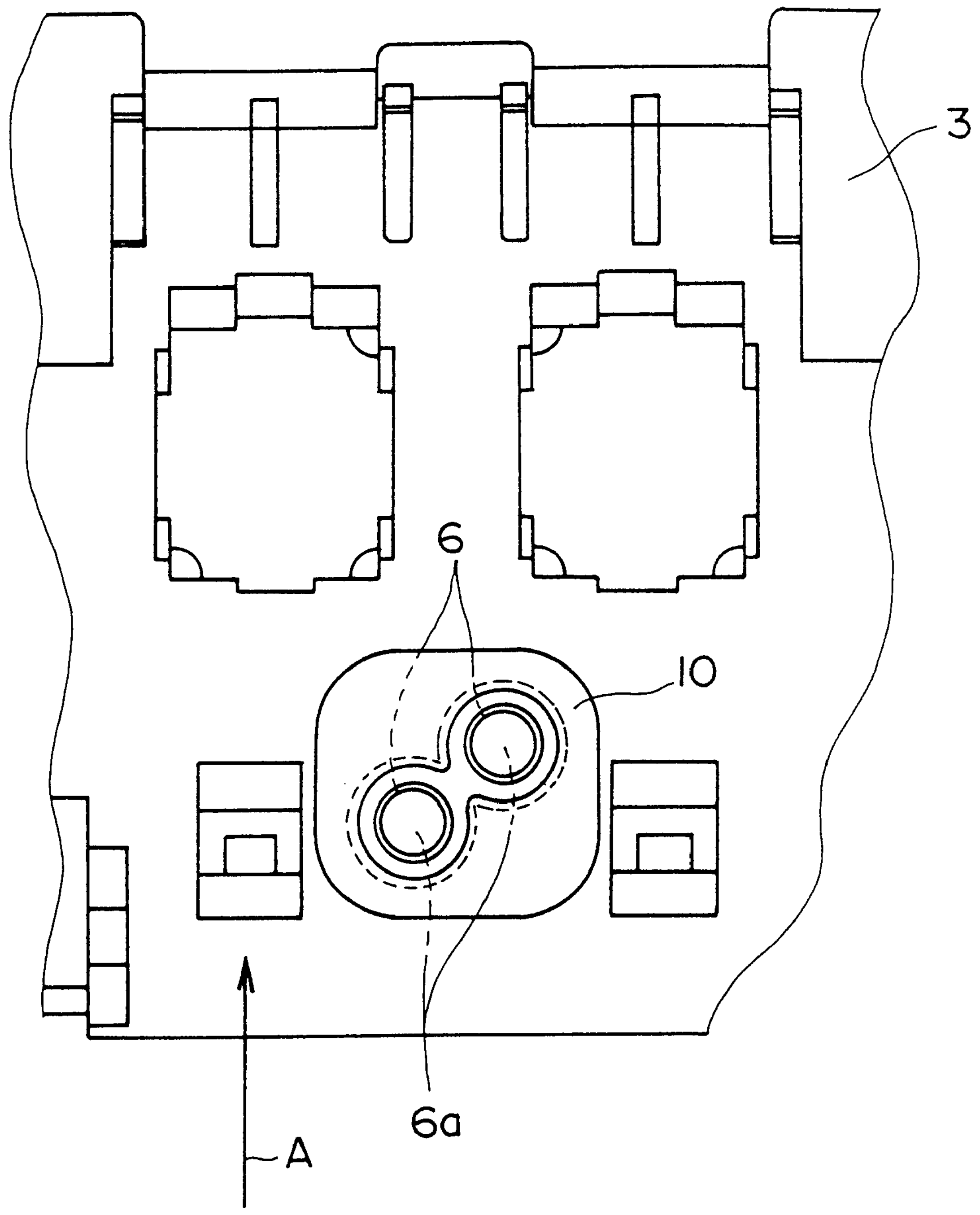
FIG. 2 is a front view of a first chute.

As can be seen in the partially cut-away front view of the first chute 3, as depicted in FIG. 2, the transparent antistatic cover 10 is disposed to cover a front surface 6*a* of the light emitting element 6, as well as a portion of the chute 3 which is in its periphery so that it constitutes a portion of the paper money transport path A.

Figure 3:
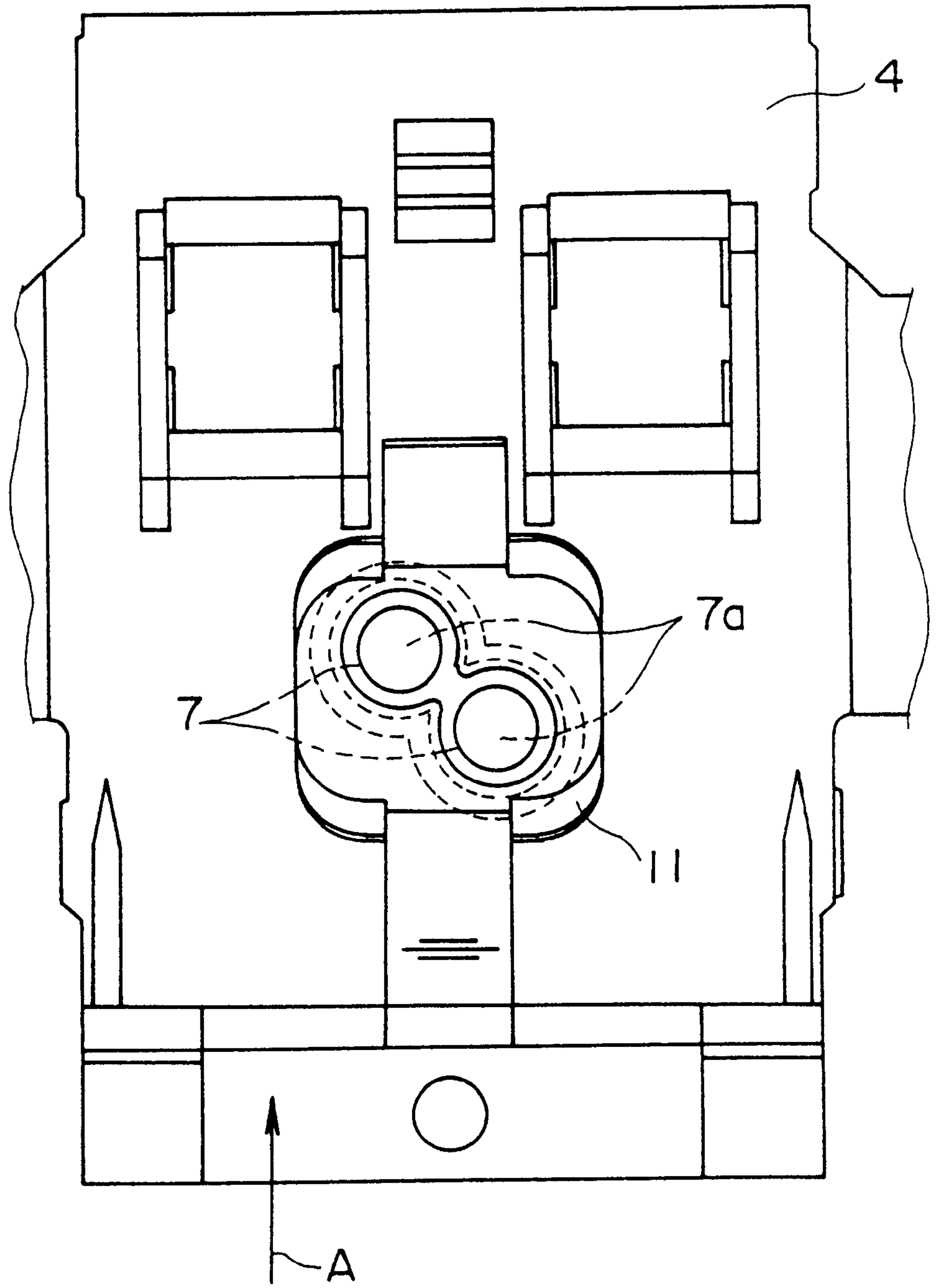
FIG. 3 is a front view of a second chute.

Similarly, as can be seen in the front view of the second chute 4, as depicted in FIG. 3, the transparent antistatic cover 11 is disposed to cover a front surface 7*a* of the light receiving element 7, as well as a portion of the chute 4 which is in its periphery so that it constitutes a portion of the paper money transport path A.

The transparent antistatic covers 10, 11 are formed from a polycarbonate (PC)-based permanent antistatic resin or the like materials.

According to such a paper money identification device 1, the surface of the optical sensor 5 (light emitting element 6 and light-receiving element 7), which borders on the paper money transport path A, is disposed, as seen in FIG. 1, so as to be covered by the transparent antistatic covers 10, 11. With the transparent antistatic covers 10, 11, any dust or dirt brought into the paper money transport path A is prevented to as great an extent as possible from adhering in a vicinity of the optical sensor 5.

Since any dust or dirt is prevented to as great an extent as possible from adhering in a vicinity of the optical sensor 5, almost no dust or dirt will obstruct the optical path between the light emitting element 6 and the light-receiving element 7 which constitute the optical sensor 5. Accordingly, the sensitivity of the optical sensor 5 can always be kept constant.

In the above-described embodiment, the surface of the optical sensor 5 (light emitting element 6 and light-receiving element 7), which faces on the paper money transport path A, is disposed so as to be covered by the transparent antistatic covers 10, 11. However, the present invention is not limited to the above embodiment; it is possible for conventional chutes, which constitute the paper money transport path A on which the optical sensor 5 is disposed, to be formed from an antistatic synthetic resin, without the transparent antistatic covers 10, 11 being used.

In such cases, this chute can be formed from a PC/ABS-based synthetic resin; i.e., a synthetic resin in which polycarbonate (PC) has been compounded with ABS resin.

Here also, since the chute which forms the paper money transport path A is formed from an antistatic synthetic resin, dust and dirt which are brought into the paper money transport path A will not adhere to the chute. Accordingly, the sensitivity of the optical sensor 5 can always be kept constant since the adhering of dust or dirt to the optical sensor 5 is prevented to as great an extent as possible.

In the above-described embodiments, either the optical sensor 5 (light emitting element 6 and light-receiving element 7) is covered with the transparent antistatic covers 10, 11, or the conventional chutes on which the optical sensor 5 is disposed are formed from an antistatic synthetic resin. However, the present invention is not limited to the above embodiments. It is possible for both conventional chutes to be subjected to an antistatic coating treatment.

Since the chutes are subjected to an antistatic coating treatment in such cases, dust and dirt which are brought into the paper money transport path A will not adhere to the chute. Therefore, the sensitivity of the optical sensor 5 can always be kept constant since the adhering of dust or dirt to the optical sensor 5 is prevented to as great an extent as possible.

As an antistatic coating agent, a solution formed from dissolving acryl, polyester or another principal component in a ketone or other solvent may be used. Such a solution should be sprayed onto the chutes which form the paper money transport path A.

As has been described in the foregoing, in a first paper money identification device according to the present invention, the surface of the optical sensor which faces on the paper money transport path A is covered by transparent antistatic covers; in a second paper money identification device according to the present invention, the paper money transport path on which the optical sensor 5 is disposed is formed from an antistatic synthetic resin; and in a third paper money identification device according to the present invention, the optical sensor is disposed on a paper money transport path which has been subjected to an antistatic coating treatment. Therefore, it is possible to provide a paper money identification device which prevents to as great an extent as possible the adhering of any dust or dirt to the optical sensor in any circumstance, which thereby keeps the sensitivity of the optical sensor constant and which maintains a stable paper money identification function over a long period of time.

The invention may be embodied in other specific forms without departing from the spirit or essential characteristics thereof. The present embodiment is therefore to be considered in all respects as illustrative and non-restrictive. The scope of the invention is indicated by the claims rather than the foregoing descriptions. All variations and changes, which come within the meaning and range of equivalent claims, are therefore intended to be embraced therein.

What is claimed is:

1. A paper money identification device which detects shade variation of a paper money that passes along a paper money transport path defined by a pair of chutes by means of an optical sensor to judge authenticity of the paper money, wherein a surface of the optical sensor facing on the paper money transport path is covered by a transparent antistatic cover which is detachably mounted to the chutes.

2. The paper money identification device according to claim 1, wherein the transparent antistatic cover is formed from a polycarbonate (PC)-based permanent antistatic resin.

3. The paper money identification device according to claim 1, wherein the chutes are formed from an antistatic synthetic resin.

4. The paper money identification device according to claim 3, wherein the chutes are formed from a synthetic resin formed from the compounding of polycarbonate (PC) and ABS resin.

5. The paper money identification device according to claim 1, wherein the chutes are subjected to an antistatic coating treatment.

6. The paper money identification device according to claim 5, wherein the antistatic coating treatment is a treatment in which a solution formed form dissolving acryl or polyester in ketone is applied to the chutes.

* * * * *